UNITED STATES PATENT OFFICE.

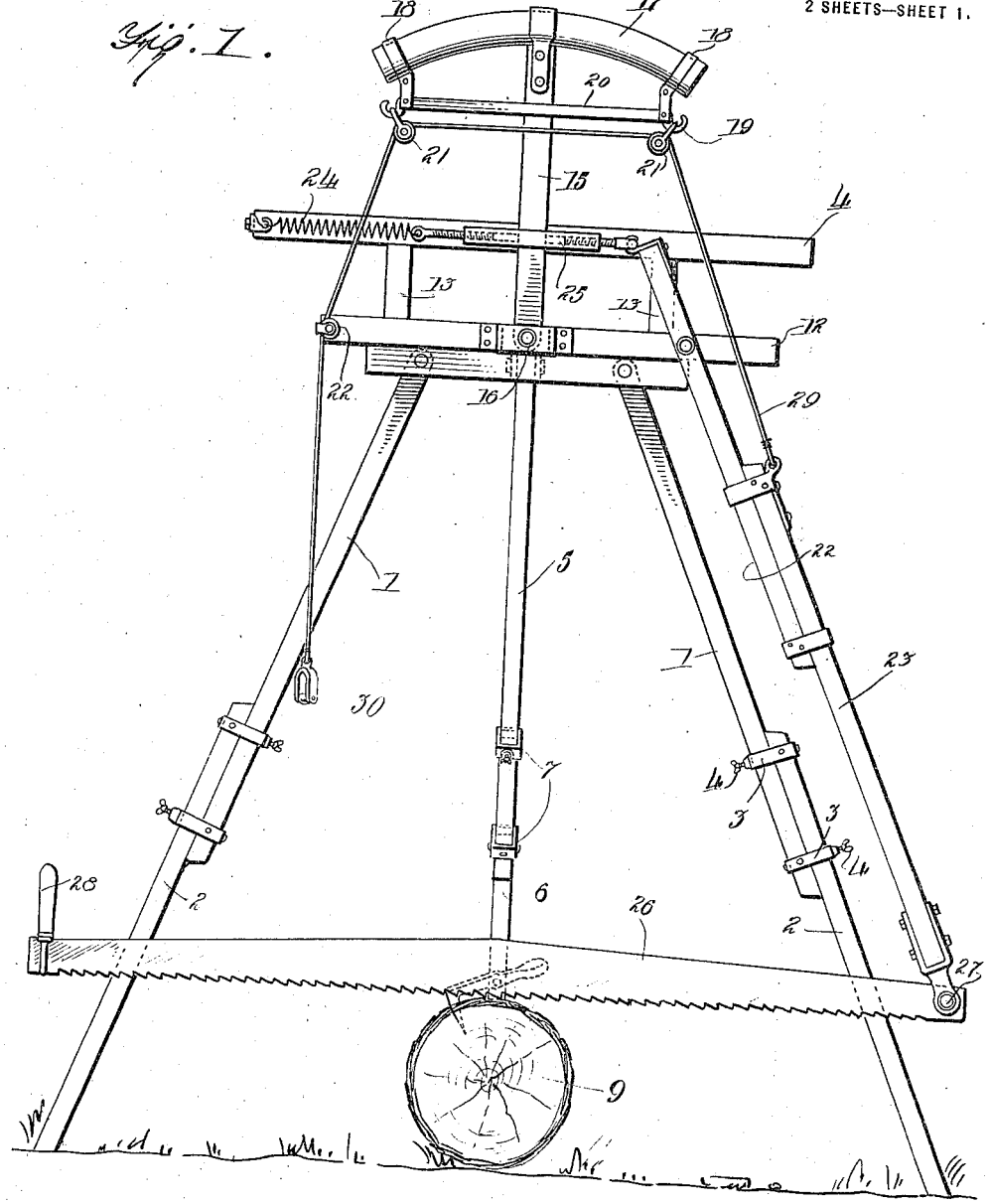

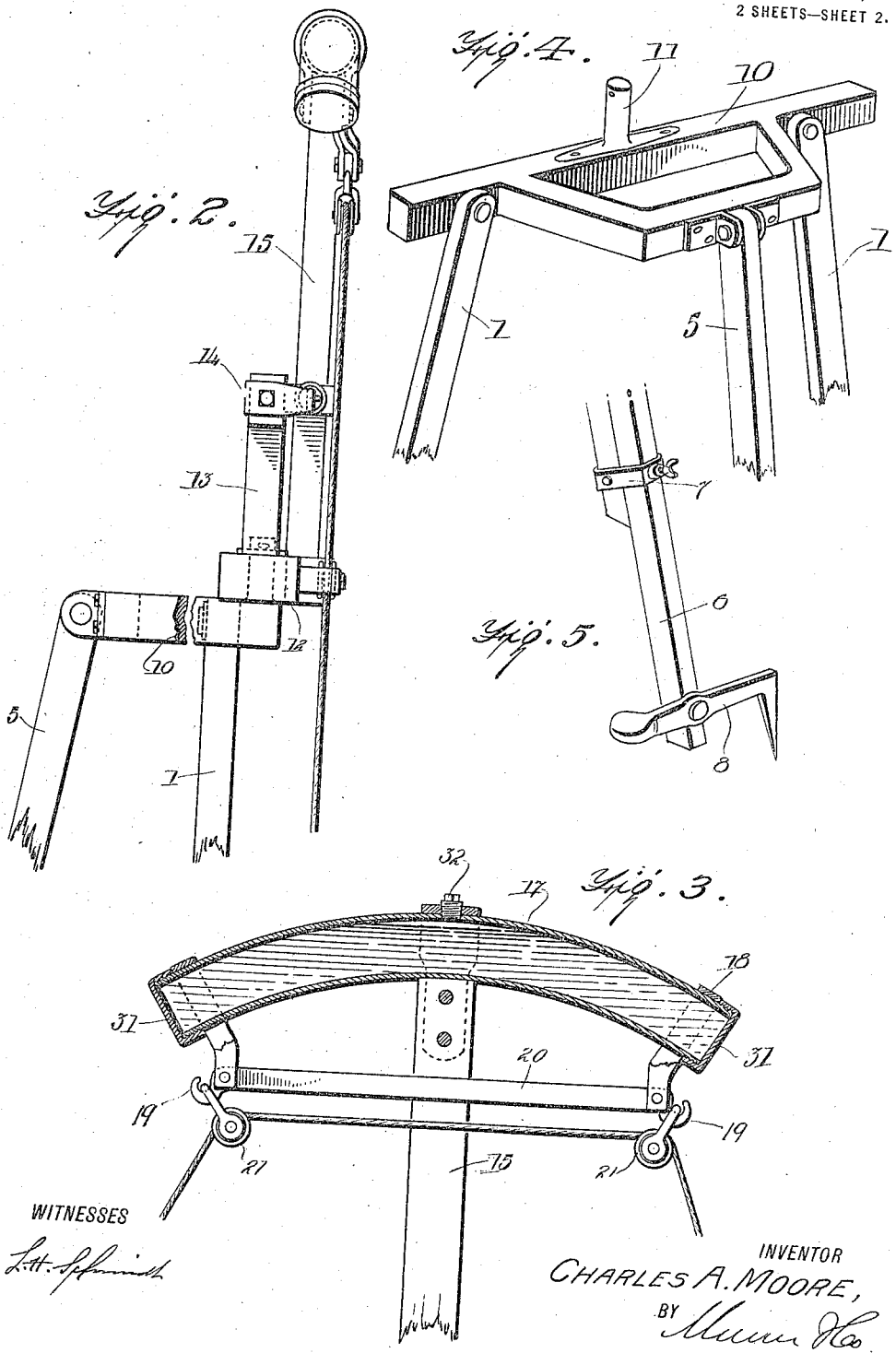

CHARLES A. MOORE, OF KINNEY, MINNESOTA.

SAWING-MACHINE.

1,307,304. Specification of Letters Patent. Patented June 17, 1919.

Application filed November 8, 1918. Serial No. 261,620.

*To all whom it may concern:*

Be it known that I, CHARLES A. MOORE, a citizen of the United States, and a resident of Kinney, in the county of St. Louis and State of Minnesota, have invented a new and useful Improvement in Sawing-Machines, of which the following is a specification.

My invention is an improvement in sawing machines, and has for its object to provide a device of the character specified, by means of which a cross cut saw may be efficiently handled by a single man, to fell a tree or to cut the tree into suitable lengths after it has been felled, the operator working at one end of the saw.

In the drawings:—

Figure 1 is a front view of the improved machine,

Fig. 2 is a detail at the upper end looking at right angles to Fig. 1,

Fig. 3 is a section through the liquid container,

Fig. 4 is a perspective view of the upper portion of the tripod frame, and

Fig. 5 is a perspective view of the dog and attached parts.

In the present embodiment of the invention, a tripod frame is provided consisting of three sectional legs and a connection between the legs at one end. Two of the legs are alike, each consisting of sections 1 and 2, and these sections are slidably connected by means of substantially rectangular frames 3, each of which is secured over one section, and slidably engages the other, and a set screw 4 is threaded through one end of each frame for holding the sections in adjusted position.

A third leg consists of sections 5 and 6 which may be connected in the same manner as the sections 1 and 2, as indicated at 7, but the section 6 is of less length than the section 2, and has a dog 8 pivoted thereto at its lower end, for engaging the log 9 to prevent movement of the leg with respect to the log.

The dog 8 is a lever, which has a foot plate at one end for permitting the easy detachment of the dog. The upper ends of the legs are pivoted to an open frame 10 and this frame has an upstanding journal pin 11, which is journaled in a cross plate 12 or an auxiliary frame arranged above the frame 10.

This auxilary frame consists of the cross plate and upstanding struts 13 near its ends, which support a third plate 14 in spaced relation above the plate 12. An oscillating bar 15 is pivoted to the plate 12 at the center thereof, as indicated at 16, and the said bar carries an arc shaped casing 17 at its upper end. This casing is arranged with its concave edge downward, and it has clips 18 at its ends which carry hooks 19, and the hooks are on the ends of a strip 20, which connects the shanks of the hooks 18. Each hook carries a pulley 21, and another pulley 22ª is journaled at one end of the plate 12. These pulleys are for a purpose to be presently described.

An arm consisting of sections 22 and 23 is pivoted to the plate 12 at the end remote from the pulley 22ª, and the upper end of this arm is yieldingly connected with the end of the plate 4 adjacent to the pulley 22ª, by means of the coil spring 24. This spring has one end connected with a plate, by means of a hook as shown, and the other end is connected to the section 22 of the arm by a turn buckle 25.

Thus the tension of the spring may be regulated. The sections 22 and 23 are slidably connected to permit them to follow the movement of the legs 1—2, 5—6, and one end of the saw 26 is pivoted to the section 23 as indicated at 27. The other end of the saw 26 carries the usual handle 28. A flexible member 29 has one end connected with the upper end of the section 23 of the arm, and this flexible member passes over the pulleys 21 and 22, and is provided with a handle 30 which hangs adjacent to the handle 28.

The casing 17 is adapted to contain a fluid, and it will be noticed referring to Fig. 3, that the ends are provided with detachable caps 31. At its center, the casing has a filling opening, which is normally closed by a plug 32. In use, to operate the saw, the operator grasps the handle 28 and the handle 30, and reciprocates the saw by alternate movements of the handles. Referring to Fig. 1, it will be noticed that the oscillating bar passes through the double nut of the turn buckle, so that the said bar is constrained to swing with the lever 22—23 and as a consequence the casing 17 is swung.

When the saw moves to the left of Fig. 1, the casing 17 is swung at the right and reaction assists in returning the casing and in also returning the saw. In practice, the liquid container will be about 2½ inches in diameter and 22 inches in length, and in summer water will be used. In cold weather non-freezable mixture must be substituted. Any saw may be used with the machine, and it is not necessary to place the tripod at each lug; or to move it with each cut, since the saw supporting frame may swing with respect to the legs of the tripod.

I claim:—

1. A machine of the character specified, comprising a tripod having one short leg provided with means for securing it to the log, an auxiliary frame mounted to swing on a vertical axis, an arm pivoted to the frame and having means for engaging one end of the saw, an oscillating bar pivoted to the auxiliary frame and extending above the same and having a yielding connection with the auxiliary frame normally acting to move the arm to draw the saw toward the arm, means for swinging the said arm away from the log, and an arc shaped casing secured to the top of the bar and adapted to be filled with liquid and to swing with the bar, the means for moving the arm being in part supported by the casing and moving therewith.

2. A machine of the character specified, comprising a tripod having one short leg provided with means for securing it to the log, an auxiliary frame mounted to swing on a vertical axis, an arm pivoted to the frame and having means for engaging one end of the saw, an oscillating bar pivoted to the auxiliary frame and extending above the same and having a yielding connection with the auxiliary frame normally acting to move the arm to draw the saw toward the bar and means for swinging the said arm away from the log.

3. A machine of the character specified, comprising a tripod having means for engaging a log, an auxiliary frame pivoted to the tripod to swing on a vertical axis, an arm pivoted to the auxiliary frame and having means for connection with one end of the saw at its lower end, the other end of the saw having a handle, an oscillating bar pivoted to the frame to swing longitudinally of the saw, and yielding means connected with the bar and with the arm for holding said bar and arm in normal position, the bar carrying at its top an arc shaped casing adapted to be filled with liquid, and means adjacent to the handle of the saw for swinging said arm in the opposite direction from the log.

4. A machine of the character specified, comprising a tripod having means for engaging a log, an auxiliary frame pivoted to the tripod to swing on a vertical axis, an arm pivoted to the auxiliary frame and having means for connection with one end of the saw at its lower end, the other end of the saw having a handle, an oscillating bar pivoted to the frame to swing longitudinally of the saw, and yielding means connected with the bar and with the arm for holding said bar and arm in normal position, and means adjacent to the handle for operating the arm to swing the saw in the opposite direction.

5. A machine of the character specified, comprising a supporting frame, an auxiliary frame pivoted to the top thereof to swing on a vertical axis, an arm pivoted to the auxiliary frame and having means for engaging one end of the saw, an oscillating bar pivoted to the auxiliary frame to swing transversely of the log and longitudinally of the saw, an arc shaped casing adapted to contain a liquid connected with the upper end of the oscillating bar, and flexible means supported in part by the casing and connected at one end to the arm and having a handle at the other end adjacent to the handle of the saw for swinging said arm away from the handle, and resilient means acting to return said arm and the oscillating arm.

6. A machine of the character specified, comprising a supporting frame, an auxiliary frame pivoted to the top thereof to swing on a vertical axis, an arm pivoted to the auxiliary frame and having means for engaging one end of the saw, an oscillating bar pivoted to the auxiliary frame to swing transversely of the log and longitudinally of the saw, an arc shaped casing adapted to contain a liquid connected with the upper end of the oscillating bar, and flexible means supported in part by the casing and connected at one end to the arm and having a handle at the other end adjacent to the handle of the saw for swinging said arm away from the handle.

7. A machine of the character specified, comprising a supporting frame having means for engaging a log, an arm pivoted to the frame and adapted for connection with one end of the saw, and an oscillating arm pivoted to the frame, flexible means for swinging said arm away from the log, and supported in part by the oscillating arm, said flexible means having a handle adjacent to the opposite end of the saw from the connection of the first named lever, and resilient means acting to return said arm and bar to normal position, the bar carrying an arc shaped casing and adapted to contain a liquid.

8. A machine of the character specified, comprising a supporting frame having means for engaging a log, an arm pivoted to the frame and adapted for connection with one end of the saw, and an oscillating bar pivoted to the frame, flexible means for swinging said arm away from the log, and supported in part by the oscillating bar, said flexible means having a handle adjacent to the opposite end of the saw from the connection of the arm, and resilient means acting to return said bar and arm to normal position.

9. In a machine of the character specified, the combination with the saw, of a frame having means for engaging the log, an arm pivoted to the frame and having means for engaging one end of the saw, the other end of the saw having a handle, means connected with the arm and extending adjacent to the handle of the saw for operating said arm to move the saw in the opposite direction, and resilient means for returning the arm and the saw to original position, and an oscillating arm pivoted to the frame and supporting in part the flexible connection, the resilient means of the arm being also connected with the oscillating bar to hold it in vertical position, and an arc shaped casing adapted to contain a liquid secured to the top of the oscillating bar and moving therewith.

10. In a machine of the character specified, the combination with the saw, of a frame having means for engaging the log, an arm pivoted to the frame and having means for engaging one end of the saw, the other end of the saw having a handle, means connected with the arm and extending adjacent to the handle of the saw for operating said arm to move the saw in the opposite direction, and resilient means for returning the arm and the saw to original position, and an oscillating bar pivoted to the frame and supporting in part the flexible connection, the resilient means of the arm being also connected with the oscillating bar lever to hold it in vertical position.

11. In a machine of the character specified, the combination with the saw, of a frame having means for engaging the log, an arm pivoted to the frame and having means for engaging one end of the saw, the other end of the saw having a handle, means connected with the arm and extending adjacent to the handle of the saw for operating said arm to move the saw in the opposite direction.

CHARLES A. MOORE.

Witnesses:
   J. H. McNiven,
   Louis Pekonen.

Copies of this patent may be obtained for five cents each, by addressing the "Commissioner of Patents, Washington, D. C."